(12) United States Patent
Fisher

(10) Patent No.: US 7,404,872 B2
(45) Date of Patent: Jul. 29, 2008

(54) PVC SEISMIC COUPLING AND METHOD OF INSTALLATION

(75) Inventor: Craig Fisher, Dallas, TX (US)

(73) Assignee: S & B Technical Products, Inc., Fort Worth, TX (US)

( * ) Notice: Subject to any disclaimer, the term of this patent is extended or adjusted under 35 U.S.C. 154(b) by 303 days.

(21) Appl. No.: 11/438,491

(22) Filed: May 22, 2006

(65) Prior Publication Data

US 2007/0267139 A1    Nov. 22, 2007

(51) Int. Cl.
*B32B 37/00* (2006.01)
*B29C 65/00* (2006.01)
*F16L 21/00* (2006.01)

(52) U.S. Cl. ............. 156/308.2; 156/304.2; 285/145.4; 285/223; 285/417

(58) Field of Classification Search ............... 285/145.3, 285/145.4, 148.9, 148.28, 223, 235, 236, 285/369, 417; 138/120, 155
See application file for complete search history.

(56) References Cited

U.S. PATENT DOCUMENTS

| | | | |
|---|---|---|---|
| 4,116,478 A | 9/1978 | Yamaji et al. | 285/302 |
| 4,119,334 A | 10/1978 | Steed | 285/236 |
| 4,548,427 A | 10/1985 | Press et al. | 285/55 |
| 4,641,861 A | 2/1987 | Scoboria | 285/39 |
| 4,846,167 A | 7/1989 | Tibbals | 128/202.27 |
| 4,850,616 A | 7/1989 | Pava | 285/41 |
| 5,192,094 A | 3/1993 | Hamamoto | 285/165 |
| 5,779,285 A * | 7/1998 | Robison | 285/337 |
| 6,305,426 B1 | 10/2001 | Sato et al. | 138/120 |
| 6,883,550 B2 | 4/2005 | Bekki et al. | 138/120 |
| 2005/0127666 A1* | 6/2005 | Dole | 285/233 |

* cited by examiner

*Primary Examiner*—John L Goff
(74) *Attorney, Agent, or Firm*—Charles D. Gunter, Jr.

(57) ABSTRACT

A seismic coupling is provided for coupling a first longitudinal section of plain end plastic pipe to a second longitudinal section of plastic pipe. The coupling is provided in two halves with a left half being initially installed on the plain end of the first section of pipe. An internal shoulder is fused onto the first section of pipe and a right half of the coupling is then fused onto the left half to capture the first end of pipe within the coupling. The second pipe end is then installed within an end opening of the coupling and held in position by a connector installed between the right half of the coupling and the second pipe end. Internal seals are provided for sealing the first and second pipe ends within the interior of the coupling.

12 Claims, 2 Drawing Sheets

PVC SEISMIC COUPLING AND METHOD OF INSTALLATION

BACKGROUND OF THE INVENTION

1. Field of the Invention

The present invention relates generally to joining and sealing systems used in plastic pipelines of the type used for transporting fluids, potable water, sewage, electrical power lines, telephone and communication lines and, more specifically to such pipe systems which are assembled together with a special coupling which is resistant to separation in the presence of a wide range of external and internal forces including seismic forces.

2. Description of the Prior Art

Fluid joining and sealing systems for plastic, fluid conveying pipes are used in a variety of industries. The pipes used in such systems are typically formed from thermoplastic materials including polyolefins and PVC. In forming a joint between sections of PVC pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. Various types of sealing technologies have been employed to assure the sealing integrity of the pipe joint.

While such pipe joints may form adequate seals, problems have sometimes occurred in some instances, particularly where the pipe line is subjected to earth movement and other seismic type forces. The tendency of the connected pipe sections to pull apart while in service, when subjected to various sources of stress, can result in consequent damage to the pipeline and environment, as well as presenting a difficulty in locating the break for repair. Plastic pipe systems which do not include interlocking ends also present problems when there is a change in direction or the pipeline, or a change in diameter of the pipe sections, since unbalanced thrust forces may separate the pipe segments. Another situation arises when extreme tensile forces are exerted on the pipe string, such as in an earthquake. As a result, various specialized end connections and coupling devices have been employed utilizing, e.g., external clamps, sleeves or other auxiliary paraphernalia. Such devices are less than advantageous since they require extraneous parts and since the protruding clamp portions of the devices always present the danger of becoming accidentally struck when installed inside a casing or of causing the pipe to move more when the ground laterally flows as a result of an earthquake. External mechanical restraint mechanisms are usually subject to corrosion and deterioration over time. They are also often complicated in design and add to the labor cost in installing the mechanisms in the field. Because they usually require tightening bolts and the like, problems can occur in field installations.

One particular problem area is that of seismic joints or connections. In earthquake prone areas or areas with underground faults, a perpendicular crossing of the fault line subjects the pipeline mainly to bending forces. An oblique crossing subjects portions of the pipeline to compression forces and bending while other portions of the pipeline may be subjected to tension forces and bending. Where the pipeline lies parallel to the main length of the fault, portions of the pipeline are subjected to tension while other portions of the pipeline are subjected to compression. All of these forces may cause an unrestrained joint to separate, causing the connection to fail.

A need therefore exists for a plastic pipe coupling which would help to insure the integrity of a pipe joint, even in the presence of extreme seismic events, such as earthquakes and earth movement.

A need also exists for such a coupling which would be relatively simple in design and economical to manufacture.

A need also exists for such a seismic coupling for plastic pipe joints which can be easily adapted for PVC pipe systems and which provides a reliable seal as well as a restrained connection.

SUMMARY OF THE INVENTION

The seismic coupler of the invention is used to couple a first longitudinal section of plain end plastic pipe to a second longitudinal section of plastic pipe. The inventive method includes steps of first fabricating a seismic coupling with the first step being accomplished by providing a left half of a generally cylindrical seismic coupler body having an end opening. The plain end of the first longitudinal section of pipe having an exterior and an interior is installed into the end opening of the left half of the seismic coupler body. A cushioning gasket is installed on the exterior of the first longitudinal section of pipe. The left half of the seismic coupler body carries a primary sealing element adjacent the end opening thereof for sealing against the plain end of the first longitudinal section of pipe. The left half of the seismic coupler body also includes an internal shoulder. Longitudinal movement of the cushioning gasket is restrained in one direction by means of the internal shoulder of the seismic coupler. In the next step of fabricating the seismic coupling, an end ring is then joined onto the plain end of the first longitudinal section of pipe, whereby an external collar is formed on the exterior of the first pipe end which captures the cushioning gasket between the external shoulder and the internal shoulder of the left half of the seismic coupler body. A right half of a seismic coupler body is then joined to the left half thereof, the right half being a generally cylindrical body having an internal seal region and an end opening. An end of the second longitudinal section of pipe is then installed within the end opening of the right half of the seismic coupler body. In the final step in the method, a connector is installed between the end of the second longitudinal section of pipe and the right half of the seismic coupler body which restrains longitudinal movement of the second longitudinal section of pipe with respect to the end opening of the coupler body.

Preferably, the end ring which forms the external collar on the exterior of the first pipe end is butt-fused onto the plain end of the first longitudinal section of pipe and the right half of the seismic coupler body is also butt-fused to the left half thereof. The cushioning gasket which is installed on the exterior of the first longitudinal section of pipe and the primary sealing element carried by the left half of the seismic coupler body are preferably both O-ring seals.

In one preferred form of the invention, the plain end of the second longitudinal section of pipe is provided with an external circumferential groove. The connector which is installed between the plain end of the second longitudinal section of pipe and the right half of the seismic coupler body is a spline which is installed through an opening provided in the right half of the seismic coupler body into the external groove on the exterior of the second longitudinal section of pipe. In one version of the seismic coupling of the invention, the internal seal region of the right half of the seismic coupler body carries an O-ring seal.

Preferably, the first and second longitudinal sections of pipe are PVC pipes. The first and second halves of the seismic coupler body are butt-fused at an assembly plant prior to delivery of the coupling to a field location. The second longitudinal section of pipe is installed within the right half of the seismic coupler body at a field location.

Additional objects, features and advantages will be apparent in the written description which follows.

DETAILED DESCRIPTION OF THE INVENTION

Figure 1:
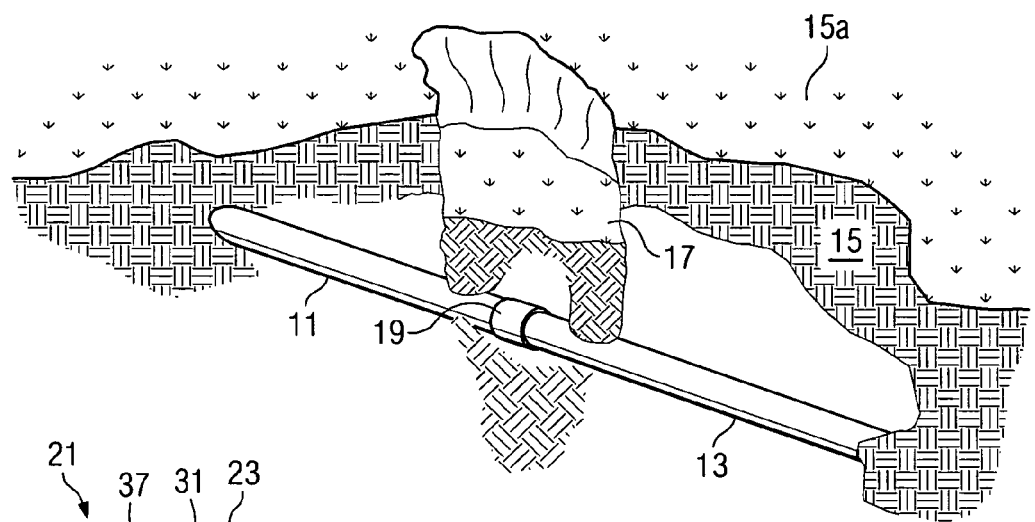
FIG. 1 is a view of a prior art plastic pipeline showing a joint therein and showing the joint being subjected to external stress caused by discontinuity in the surrounding earthern formations

The present invention has as an object to provide a secure joint or coupling for a plastic pipe system of the type having a first longitudinal section of plain end plastic pipe which is to be joined to a second longitudinal section of plastic pipe. Pipes of this type are commonly used for the conveyance of fluids under pressure, as in city water lines. They may also be used as free-flowing conduits running partly full, as in drains and sewers. Pipes for conveying water in appreciable quantities have been made of steel, cast iron, concrete, ductile iron, asbestos cement, and most recently, plastics including the various polyolefins and PVC. This invention has particular application to plastic pipes, and particularly to polyolefin and PVC pipe of the type used for municipal water works applications. Pipes of this type must be joined in end to end relationship. This is typically accomplished in a telescoping fashion where the spigot end of one pipe is inserted into the socket end of the engaging pipe. The socket end has an opening large enough to receive the spigot end of the mating pipe.

Those skilled in the business of plastic pipe and pipeline construction are constantly in search of improved means for securing the joints formed by connecting the ends of pipe together. As a result, there are numerous methods currently in use by those in the pipe and pipeline construction industry to obtain a secure joint. These methods employ different types of components and also can be distinguished by the various ways in which the components are employed. The selection of these different methods will usually depend on the overall design requirements of the pipeline. In any event, a gasket is typically present within the socket end of the pipe which is intended to prevent leakage of fluid from the joint by forming a seal between the two pipe sections. This method is commonly used in plastic pipelines.

As has been described, in addition to the necessity of providing an effective seal at the pipe joint, another important design requirement exists when it becomes necessary to join the pipe components in a restrained manner. This is usually desired in order to prevent the pipe components from separating due to thrust forces that occur when there is a change in direction of the pipeline or a change in diameter of the pipe sections and the pipe line is subjected to internal pressure, and sometimes, when earth tremors or other external factors such as earthquakes come in to play. It is also important to prevent separation when there are significant soil strains, for example, strain resulting from pumping down the water table level in an aquifier or when large soil subsidences occur as a result of mining activities. fitting manufacturing location. In the first step of the method of the invention, a left half (21 in FIG. 2) of a generally cylindrical seismic coupler body 23 is provided having an end opening 25. A primary sealing element, such as O-ring seal 26, is carried in a mating groove provided in the coupler body adjacent the end opening 25. The plain end 27 of a first longitudinal section of pipe 29 having an exterior 31 and an interior 33 is inserted within the end opening 25 of the left half of the seismic coupler body 23. The opposite end of the plain pipe end 27 is provided with an external circumferential groove (not shown in FIG. 2), similar to the groove 69 shown for the pipe end 67 in FIG. 4.

Figure 2:
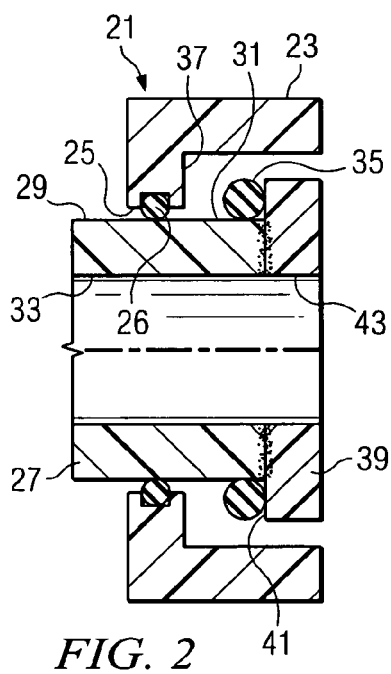
FIG. 2 is a partial side, cross sectional view of the first step in fabricating the seismic coupling of the invention in which a plain end of a section of plastic pipe is inserted into the left half of the seismic coupler body.

In the next step of the method, a cushioning gasket, such as the O-ring seal 35 shown in FIG. 2 is installed on the exterior 31 of the first longitudinal section of pipe 29. As will be apparent, the cushioning gasket 35 functions in the nature of a shock absorber if the pipe is pulled apart as a result of ground movements or other forces. Longitudinal movement of the cushioning gasket 35 is restrained in one direction by means of an internal shoulder 37 of the seismic coupler body 23.

In the next step of fabricating the seismic coupling, an end ring 39 is joined onto the plain end 27 of the first longitudinal section of pipe 29, whereby an external collar 41 is formed on the exterior of the first pipe end 27 which captures the cushioning gasket 35 between the external shoulder 41 and the internal should 37 of the left half of the seismic coupler body 23. The O-ring 26 carried adjacent the coupler body end opening 25 also forms a sliding seal with respect to the exterior 31 of the section of pipe 29.

Note that in FIG. 2 the end ring 39 is shown already joined to the plain end pipe 27. As described above, this would only be accomplished after the plain end pipe 27 had been inserted within the end opening 25 of the left half of the coupler body 23. The end ring 39 can be joined to the plain end pipe 27 in any convenient fashion, thereby aligning the internal bore 43 thereof with the interior diameter 33 of the remainder of the pipe section. For example, with PVC pipe, the end ring 39 can be conveniently joined by butt fusion, or a similar technique for joining plastics. Butt fusion is a technique commonly employed in joining PVC pipe sections and will be familiar to those skilled in the relevant arts.

Figure 3:
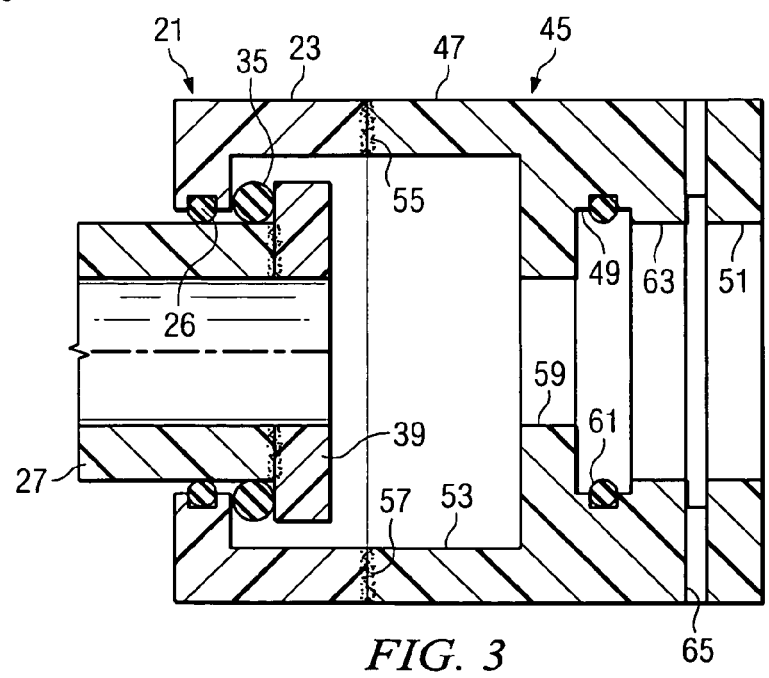
FIG. 3 is a view similar to FIG. 2, but showing the second step in the method of fabricating the seismic coupling of the invention in which the right half of the seismic coupler body is fused to the left half.

In the next fabrication step, a right half 45 of the seismic coupler body is joined to the left half 21, thereof (see FIG. 3). The right half 45 of the coupler body is a generally cylindrical member having a cylindrical exterior surface 47, an internal seal region 49 and an end opening 51. The right As discussed in the "Background" section, there are various types of connections which are commercially available and which are used in the water works industry for restraining plastic pipelines. Each of these traditional restraining mechanisms adds considerable cost to the pipe installation as well as adding the possibility of human error depending on the specific conditions and applications. Most current restraining systems for plastic pipe systems offered in the industry require a substantial amount of labor to install in the field. Under most installation conditions, the restraining systems are cumbersome to install and represent a substantial additional effort for the contractor.

Turning to FIG. 1, there is shown a prior art plastic pipe system consisting of a first longitudinal section 11 of plain end plastic pipe and a second longitudinal section 13 of plastic pipe. In the discussion which follows, the terms "plastic", "polyolefin" "vinyl compound" and "polyvinyl chloride" (PVC) have particular meanings which are taken from common usage in the relevant pipe joining industry. The term "polyolefin" is intended to encompass that family of materials such as polyethylene, polypropylene, etc. The term "vinyl compound" is intended to encompass that family of vinyl compounds having the general formula:

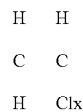

for the basic monomer building block for the thermoplastic. However, the preferred material for purposes of the present invention is polyvinyl chloride (PVC). This material is widely used in the manufacture of plastic pipe and will be well familiar to those in the municipal water works industry.

In the discussion which follows, the term "plain end" plastic pipe means a longitudinal section of pipe having an end which is not upset or flared or "belled" as commonly understood in the industry. Rather, the plastic pipe end may be generally cylindrical and of the same general outer diameter as the remainder of the length of the longitudinal section of pipe. As can be seen in FIG. 1, the pipe sections 11, 13 are surrounded by various earthern strata 15, 15a which may contain various discontinuities, as at 17. In this and other commonly encountered situations, it is preferable to provide a restrained joint at the coupling 19.

The restrained joint or coupling of Applicant's invention, as will be described, provides a secure connection between plastic pipe sections which does not require external metallic bands, clamps, and the like. The coupling is first fabricated in a series of method steps, preferably at a pipe or fabricated half of the coupler body 45 also has an opposing end opening 53 and an end face 55 which can conveniently be butt fused to the mating end face 57 of the left half of the coupler body 21.

The interior of the right half of the coupler body 45 includes a stepped interior bore 59 located adjacent the internal seal region 49. An O-ring seal 61 is carried in the internal groove which makes up the internal seal region. The grooved seal region 49 is located adjacent an additional stepped surface 63, which, in turn, is located adjacent a bore 65. The bore 65 communicates the interior of the right half of the coupler with the cylindrical exterior surface 47.

Figure 4:
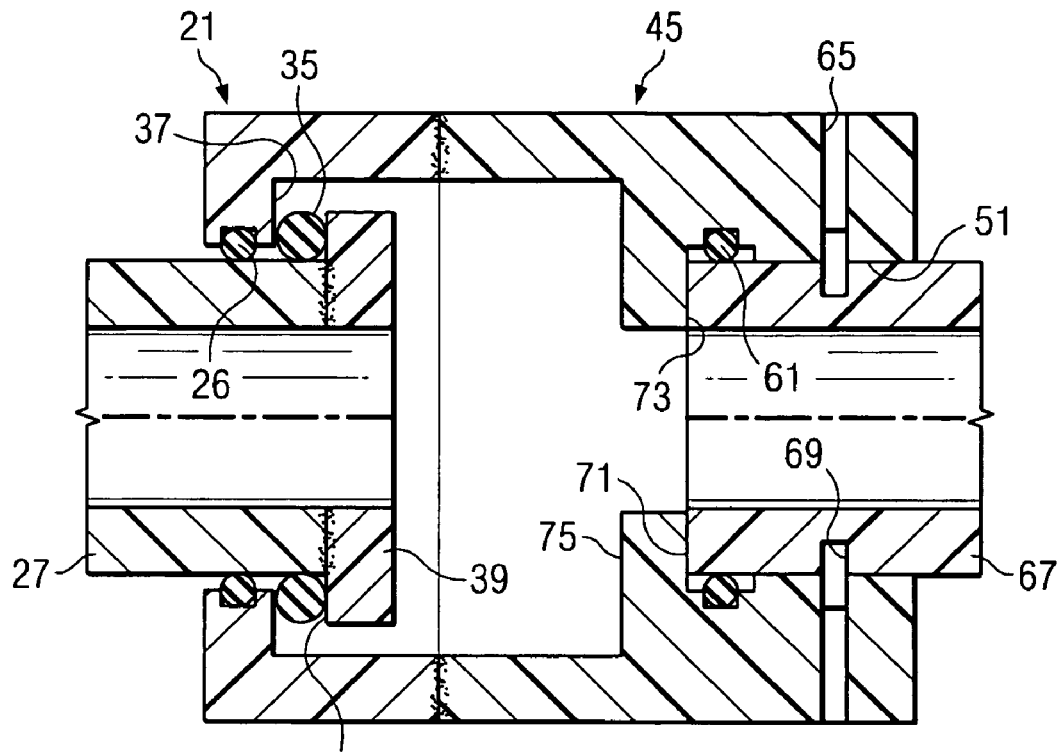
FIG. 4 is a continuation of the method of the invention showing the first step of a field assembly in which a grooved end of a section of plastic pipe is inserted into the previously fabricated seismic coupler body.
Figure 5:
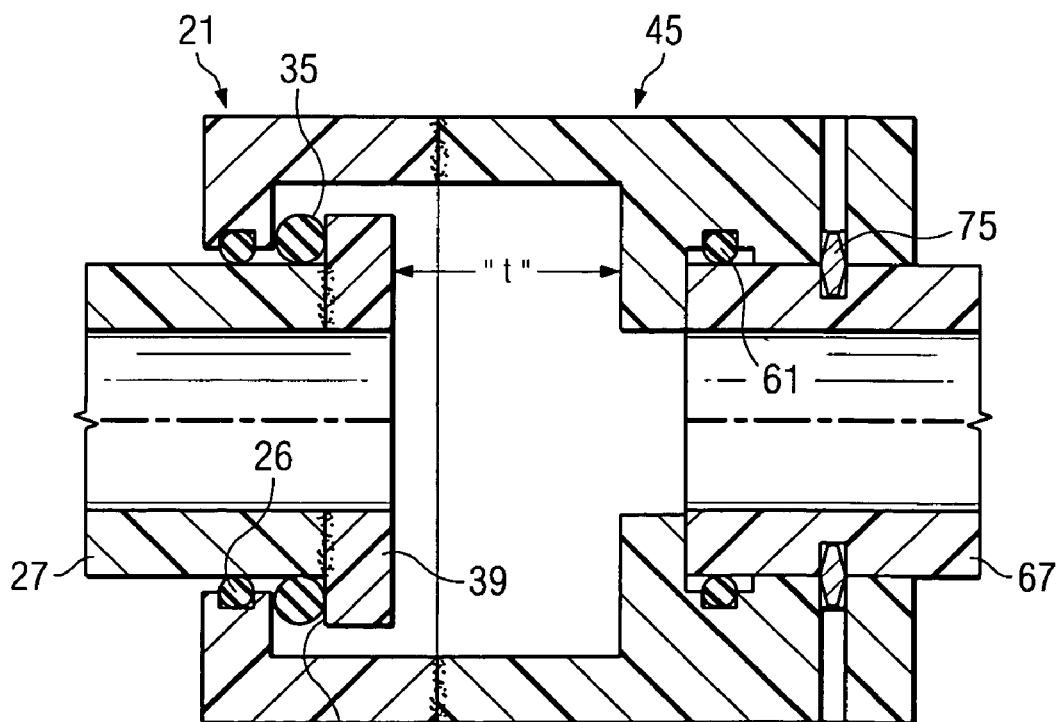
FIG. 5 is a continuation of the method of FIG. 4 showing the second field assembly step in which a retainer element is inserted through a hole provided in the seismic coupler body.

After fabricating the seismic coupler body, the first longitudinal section of pipe 11 carrying the coupler body may be stored in a warehouse or shipped to a field location for installation. FIG. 4 shows the first field assembly step of the coupling of the invention in which an end 67 of a second longitudinal section of plastic pipe is inserted within the end opening 51 of the right half of the coupler body. The particular pipe end 67 is provided with an external groove 69 adjacent the end face 71 thereof. As seen in FIG. 5, the end face 71 contacts the internal shoulder 73 formed by the stepped interior bore 59 of the right half of the coupler. When the end face 71 contacts the shoulder 73, external groove 69 on the pipe end is aligned with the bore 65 of the coupler. The exterior of the pipe end 67 also forms a fluid tight seal with the O-ring 61 which is carried on the internal seal region 49 of the coupler.

In the next step of field assembly of the coupling, a connector is installed between the pipe end 67 of the second longitudinal section of pipe and the right half 45 of the coupler body. The connector restrains longitudinal movement of the second longitudinal section of pipe with respect to the end opening 51 of the coupler body. Although the connector could assume various forms, in the example illustrated, a spline 75 is inserted through the bore 65 of the hole in the coupler body 45 until it contacts the groove 69 on the pipe exterior and travels approximately 360 degrees around the external circumference of the second longitudinal pipe section. This step concludes the field assembly of the second longitudinal section of pipe within coupler body to form the completed seismic coupling.

The operation of the seismic coupling of the invention will now be briefly described. As viewed in FIG. 5, it will be appreciated that, while the second pipe end 67 is restrained from movement by the spline 75, that the first pipe end 27 is allowed a certain range of longitudinal travel (indicated as "t" in FIG. 5) within the interior of the coupler body. The internal flange (75 in FIG. 4) and the internal shoulder 37 of the coupler body determine the length of travel allowed the first pipe end 27. In the case of internal or external forces acting on the pipeline, the length of travel "t" afforded the first pipe end 27, absorbs or counteracts these forces to prevent separation of the coupling. The internal bore of the coupler body also allows for rotational capabilities of the pipe sections, as well. Both longitudinal and rotational flexibility are required to survive the ground movements encountered in the case of extreme seismic events, such as an earthquake.

An invention has been provided with several advantages. The method of coupling pipes of the invention provides a restrained joint which resists various environmental forces which might otherwise cause the pipe joint to fail. The coupling is formed of the same type materials as the pipe system itself and thus can be conveniently butt fused or joined with a suitable glue of adhesive, or by other convenient means. The coupling does not require external metallic bands, clamps, or the like, which might form obstructions, e.g., in a casing installation, and which might be subject to rust and corrosion. The system is also economical to fabricate and install and can be quicky accomplished in the field with little additional labor or expense. Because the coupler body is installed on the pipe end of the first section of pipe at the factory, it is only necessary to insert the second pipe end within the coupler body and install the connector system in the field. This simplifies the installation process and greatly reduces the chance of human error of the type which might be encountered in properly torquing T-bolts and the like.

While the invention has been shown in only one of its forms, it is not thus limited but is susceptible to various changes and modifications without departing from the spirit thereof.

What is claimed is:

1. A method of coupling a first longitudinal section of plain end plastic pipe to a second longitudinal section of plastic pipe, the method comprising the steps of:

providing a left half of a generally cylindrical seismic coupler body having an end opening and a primary sealing element located adjacent the end opening;

inserting the plain end of the first longitudinal section of pipe into the end opening of the left half of the seismic coupler body, the first longitudinal section of pipe having an exterior and an interior, and wherein the left half of the seismic coupler body includes an internal shoulder;

installing a cushioning gasket on the exterior of the first longitudinal section of pipe, longitudinal movement of the cushioning gasket being restrained in one direction by means of the internal shoulder of the seismic coupler;

fusing an end ring onto the plain end of the first longitudinal section of pipe whereby an external collar is formed on the exterior of the first pipe end which captures the cushioning gasket between the external shoulder and the internal shoulder of the left half of the seismic coupler body;

joining a right half of a seismic coupler body to the left half thereof, the right half being a generally cylindrical body having an internal seal region and an end opening;

inserting an end of the second longitudinal section of pipe within the end opening of the right half of the seismic coupler body; and installing a connector between the end of the second longitudinal section of pipe and the right half of the seismic coupler body which restrains longitudinal movement of the second longitudinal section of pipe with respect to the end opening of the coupler body.

2. The method of claim 1, wherein the end ring which forms the external collar on the exterior of the first pipe end is butt-fused onto the plain end of the first longitudinal section of pipe.

3. The method of claim 2, wherein the right half of the seismic coupler body is butt-fused to the left half thereof.

4. The method of claim 3, wherein the cushioning gasket which is installed on the exterior of the first longitudinal section of pipe is an O-ring.

5. The method of claim 4, wherein the plain end of the second longitudinal section of pipe is provided with an external circumferential groove and wherein the connector which is installed between the plain end of the second longitudinal section of pipe and the right half of the seismic coupler body is a spline which is installed through an opening provided in the right half of the seismic coupler body into the external groove on the exterior of the second longitudinal section of pipe.

6. The method of claim 5, wherein the primary sealing element which is carried adjacent the end opening of the left half of the seismic coupler body is an O-ring seal which forms a sliding seal with respect to the exterior of the first longitudinal section of pipe.

7. The method of claim 6, wherein the first and second longitudinal pipe sections are allowed both longitudinal and rotational movement with respect to the seismic coupler body to accommodate extreme seismic events, such as an earthquake.

8. The method of claim 1, wherein the first and second longitudinal sections of pipe are PVC pipes.

9. The method of claim 3, wherein the first and second halves of the seismic coupler body are butt-fused at an assembly plant prior to delivery of the seismic coupling to a field location.

10. The method of claim 9, wherein the second longitudinal section of pipe is installed within the right half of the seismic coupler body at a field location.

11. A method of coupling a first longitudinal section of plain end PVC pipe to a second longitudinal section of PVC pipe, the method comprising the steps of:

providing a left half of a generally cylindrical seismic coupler body having an end opening and a primary sealing element carried adjacent the end opening;

inserting the plain end of the first longitudinal section of pipe into the end opening of the left half of the seismic coupler body, the first longitudinal section of pipe having an exterior and an interior, and wherein the left half of the seismic coupler body includes an internal shoulder;

installing an O-ring cushioning gasket on the exterior of the first longitudinal section of pipe, longitudinal movement of the cushioning gasket being restrained in one direction by means of the internal shoulder of the seismic coupler body;

butt-fusing an end ring onto the plain end of the first longitudinal section of pipe, whereby an external collar is formed on the exterior of the first pipe end which captures the cushioning gasket between the external shoulder and the internal shoulder of the left half of the seismic coupler body;

butt-fusing a right half of a seismic coupler body to the left half thereof, the right half being a generally cylindrical body having an internal seal region and an end opening;

inserting an end of the second longitudinal section of pipe within the end opening of the right half of the seismic coupler body, the end of the second longitudinal section of pipe being provided with an external circumferential groove; and installing a spline connector between the end of the second longitudinal section of pipe and the right half of the seismic coupler body by providing right angled bore in the right half of the seismic coupler body and passing a spline through the bore in a direction generally perpendicular to the exterior of the second longitudinal pipe section, contact between the spline and the circumferential groove serving to restrain longitudinal movement of the second longitudinal section of pipe with respect to the end opening of the coupler body.

12. The method of claim 11, wherein the first and second longitudinal pipe sections are allowed both longitudinal and rotational movement with respect to the seismic coupler body to accommodate extreme seismic events, such as an earthquake.

* * * * *